US012471618B2

(12) United States Patent
Johnson et al.

(10) Patent No.: US 12,471,618 B2
(45) Date of Patent: Nov. 18, 2025

(54) STIMULUS-RESPONSIVE POUCH

(71) Applicant: NICOVENTURES TRADING LIMITED, London (GB)

(72) Inventors: Savannah Johnson, Winston-Salem, NC (US); Ronald K. Hutchens, East Bend, NC (US); David Neil McClanahan, Winston-Salem, NC (US); Pankaj Patel, Clemmons, NC (US); Travis O'Neal, Pinnacle, NC (US); Dwayne William Beeson, Kernersville, NC (US); Wesley Steven Jones, Lexington, NC (US); Christopher Keller, Advance, NC (US); Thomas H. Poole, Winston-Salem, NC (US); Nicolas von Cosmos, Moravian Falls, NC (US); Anthony Richard Gerardi, Winston-Salem, NC (US); Chris J. Grimes, High Point, NC (US); Steven Lee Alderman, Lewisville, NC (US); Darrell Eugene Holton, Jr., Clemmons, NC (US)

(73) Assignee: Nicoventures Trading Limited, London (GB)

( * ) Notice: Subject to any disclaimer, the term of this patent is extended or adjusted under 35 U.S.C. 154(b) by 899 days.

(21) Appl. No.: 17/185,144

(22) Filed: Feb. 25, 2021

(65) Prior Publication Data

US 2021/0177036 A1    Jun. 17, 2021

Related U.S. Application Data

(63) Continuation of application No. PCT/IB2020/061618, filed on Dec. 8, 2020.
(Continued)

(51) Int. Cl.
*A24B 13/00*    (2006.01)
*A24B 15/12*    (2006.01)
(Continued)

(52) U.S. Cl.
CPC .............. *A24B 13/00* (2013.01); *A24B 15/12* (2013.01); *A24F 40/20* (2020.01); *A24F 40/42* (2020.01);
(Continued)

(58) Field of Classification Search
CPC ......... A24B 13/00; A24B 15/12; A24F 40/20; A24F 40/42; A24F 23/02; B33Y 10/00; B33Y 70/00; B33Y 80/00
See application file for complete search history.

(56) References Cited

U.S. PATENT DOCUMENTS 2,475,241 A    7/1949 Hermanson
3,338,992 A    8/1967 Kinney
(Continued)

FOREIGN PATENT DOCUMENTS

CA    2692836 A1 *    8/2010    .......... A61M 1/3639
CN    109068750 A *    12/2018    ........... A24B 15/167
(Continued)

OTHER PUBLICATIONS

Anonymous, "The intelligent incontinence diaper is a worldwide sensation", Oct. 29, 2019 (Oct. 29, 2019), Retrieved from the Internet: URL:https://mekoprint.com/news/the-intelligent-incontinence-diaper-is-a-world-sensation-spearheading-our-way-into-wearables/ XP055837784 [retrieved on Sep. 3, 2021] 10-14,19-22 p. 1-p. 5.
(Continued)

*Primary Examiner* — Justin M Kratt
(74) *Attorney, Agent, or Firm* — Womble Bond Dickinson (US)

(57) ABSTRACT

Provided herein are pouched products including a chromogenic material or an electronic component, wherein the
(Continued)

chromogenic material and the electronic component are responsive to a stimulus. The stimulus may be a change in pH, a change in temperature, or exposure to moisture. Such pouched products can be employed to detect various changes associated with the pouched product.

12 Claims, 1 Drawing Sheet

Related U.S. Application Data (60) Provisional application No. 62/945,460, filed on Dec. 9, 2019.

(51) Int. Cl.
| | | |
|---|---|---|
| *A24F 40/20* | (2020.01) | |
| *A24F 40/42* | (2020.01) | |
| *B33Y 10/00* | (2015.01) | |
| *B33Y 70/00* | (2020.01) | |
| *B33Y 80/00* | (2015.01) | |
| *A24F 23/02* | (2006.01) | |

(52) U.S. Cl.
CPC ............... *B33Y 10/00* (2014.12); *B33Y 70/00* (2014.12); *B33Y 80/00* (2014.12); *A24F 23/02* (2013.01)

(56) References Cited

U.S. PATENT DOCUMENTS

| | | |
|---|---|---|
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,734,812 A | 5/1973 | Yazawa |
| 3,802,817 A | 4/1974 | Matsuki et al. |
| 3,849,241 A | 11/1974 | Buntin et al. |
| 3,972,759 A | 8/1976 | Buntin |
| 4,340,563 A | 7/1982 | Appel et al. |
| 4,622,259 A | 11/1986 | McAmish et al. |
| 4,907,605 A | 3/1990 | Ray et al. |
| 5,167,244 A | 12/1992 | Kjerstad |
| 5,200,246 A | 4/1993 | Sabee |
| 5,334,446 A | 8/1994 | Quantrille et al. |
| 7,032,601 B2 | 4/2006 | Atchley et al. |
| 7,498,281 B2 | 3/2009 | Iwasaki et al. |
| 7,861,728 B2 | 1/2011 | Holton, Jr. et al. |
| 7,950,399 B2 | 5/2011 | Winterson et al. |
| 7,980,251 B2 | 7/2011 | Winterson et al. |
| 8,124,147 B2 | 2/2012 | Cheng et al. |
| 8,336,557 B2 | 12/2012 | Kumar et al. |
| 8,557,071 B2 | 10/2013 | Weiler |
| 8,627,828 B2 | 1/2014 | Strickland et al. |
| 8,747,562 B2 | 6/2014 | Mishra et al. |
| 8,833,378 B2 | 9/2014 | Axelsson et al. |
| 8,846,075 B2 | 9/2014 | Jonsson et al. |
| 8,863,755 B2 | 10/2014 | Zhuang et al. |
| 8,931,493 B2 | 1/2015 | Sebastian et al. |
| 8,978,661 B2 | 3/2015 | Atchley et al. |
| 8,992,974 B2 | 3/2015 | McCarty |
| 9,066,540 B2 | 6/2015 | Atchley et al. |
| 9,125,434 B2 | 9/2015 | Fuisz |
| 9,161,567 B2 | 10/2015 | Shikata et al. |
| 9,161,908 B2 | 10/2015 | Nilsson |
| 9,167,835 B2 | 10/2015 | Sengupta et al. |
| 9,185,931 B2 | 11/2015 | Gao et al. |
| 9,358,296 B2 | 6/2016 | McCarty |
| 9,402,414 B2 | 8/2016 | Griscik et al. |
| 9,402,809 B2 | 8/2016 | Axelsson et al. |
| 9,414,624 B2 | 8/2016 | Carroll et al. |
| 9,462,827 B2 | 10/2016 | Carroll et al. |
| 9,468,233 B2 | 10/2016 | Macko et al. |
| 9,521,864 B2 | 12/2016 | Gao et al. |
| 9,693,582 B2 | 7/2017 | Carroll et al. |
| 9,848,634 B2 | 12/2017 | Fuisz |
| 9,854,830 B2 | 1/2018 | Gao et al. |
| 9,854,831 B2 | 1/2018 | Gao et al. |
| 9,884,015 B2 | 2/2018 | Gao et al. |
| 9,925,145 B2 | 3/2018 | Hübinette et al. |
| 9,930,909 B2 | 4/2018 | Gao et al. |
| 9,986,756 B2 | 6/2018 | Gao et al. |
| 9,999,243 B2 | 6/2018 | Gao et al. |
| 10,064,270 B2 | 8/2018 | Jur et al. |
| 10,105,320 B2 | 10/2018 | Gao et al. |
| 10,130,120 B2 | 11/2018 | Mishra et al. |
| 10,244,786 B2 | 4/2019 | Gao et al. |
| 10,258,076 B2 | 4/2019 | Carroll et al. |
| 10,315,889 B2 | 6/2019 | Kreischer et al. |
| 10,327,467 B2 | 6/2019 | Carroll et al. |
| 10,334,873 B2 | 7/2019 | Mishra et al. |
| 10,463,070 B2 | 11/2019 | Carroll et al. |
| 10,609,949 B2 | 4/2020 | Hodin et al. |
| 10,647,459 B2 | 5/2020 | Persson |
| 10,849,360 B2 * | 12/2020 | Batista .................. A24F 40/60 |
| 2004/0121689 A1 | 6/2004 | Anderson et al. |
| 2004/0166756 A1 | 8/2004 | Kurihara et al. |
| 2005/0061339 A1 | 3/2005 | Hansson et al. |
| 2007/0062549 A1 | 3/2007 | Holton et al. |
| 2008/0029110 A1 | 2/2008 | Dube et al. |
| 2008/0085649 A1 | 4/2008 | Salamero et al. |
| 2008/0249492 A1 | 10/2008 | Schmidt |
| 2008/0317911 A1 | 12/2008 | Schleef et al. |
| 2009/0022917 A1 | 1/2009 | Gedevanishvili et al. |
| 2009/0041903 A1 | 2/2009 | Moon |
| 2009/0133704 A1 | 5/2009 | Strickland et al. |
| 2010/0128752 A1 * | 5/2010 | Van Suetendael ..... G01N 25/18 374/44 |
| 2010/0330236 A1 | 12/2010 | Miyahara et al. |
| 2011/0180087 A1 | 7/2011 | Gee et al. |
| 2011/0268809 A1 | 11/2011 | Brinkley et al. |
| 2011/0303232 A1 | 12/2011 | Williams |
| 2011/0303511 A1 | 12/2011 | Brinkley et al. |
| 2012/0051672 A1 | 3/2012 | Foss et al. |
| 2012/0055493 A1 | 3/2012 | Novak, III et al. |
| 2012/0103353 A1 | 5/2012 | Sebastian et al. |
| 2012/0237640 A1 | 9/2012 | Buffet et al. |
| 2013/0206150 A1 | 8/2013 | Duggins et al. |
| 2013/0251779 A1 | 9/2013 | Svandal et al. |
| 2013/0276801 A1 | 10/2013 | Byrd et al. |
| 2013/0287901 A1 | 10/2013 | Hong |
| 2014/0026912 A1 | 1/2014 | Rushforth et al. |
| 2014/0083438 A1 | 3/2014 | Sebastian et al. |
| 2014/0141677 A1 | 5/2014 | Tai et al. |
| 2014/0255452 A1 | 9/2014 | Reddick et al. |
| 2015/0096573 A1 | 4/2015 | Gao et al. |
| 2015/0096574 A1 | 4/2015 | Gao et al. |
| 2015/0096576 A1 | 4/2015 | Gao et al. |
| 2016/0000140 A1 | 1/2016 | Sebastian et al. |
| 2016/0073689 A1 | 3/2016 | Sebastian et al. |
| 2016/0157515 A1 | 6/2016 | Chapman et al. |
| 2016/0192703 A1 | 7/2016 | Sebastian et al. |
| 2016/0208440 A1 | 7/2016 | Byrd et al. |
| 2017/0160247 A1 * | 6/2017 | Van Loon ............ B01J 20/3293 |
| 2017/0188622 A1 | 7/2017 | Wilson, V |
| 2017/0280764 A1 | 10/2017 | Sahlén et al. |
| 2017/0283164 A1 | 10/2017 | Aranoz |
| 2017/0318858 A1 | 11/2017 | Hodin et al. |
| 2018/0140007 A1 | 5/2018 | Aspgren et al. |
| 2018/0153211 A1 | 6/2018 | Persson |
| 2018/0255826 A1 | 9/2018 | Persson et al. |
| 2019/0077589 A1 | 3/2019 | Garden |
| 2019/0255035 A1 | 8/2019 | Bruun |
| 2019/0291900 A1 | 9/2019 | Persson et al. |
| 2019/0297960 A1 | 10/2019 | Jur et al. |
| 2020/0037638 A1 | 2/2020 | Faraci et al. |
| 2020/0128870 A1 | 4/2020 | Hassler et al. |

(56) References Cited

U.S. PATENT DOCUMENTS

2020/0275689 A1  9/2020  Lewerenz
2020/0297026 A1  9/2020  Kannisto et al.

FOREIGN PATENT DOCUMENTS

| | | | | |
|---|---|---|---|---|
| CN | 110218204 A | * | 9/2019 | ........... C07D 333/22 |
| GB | 2319265 | | 5/1998 | |
| KR | 20-0431474 | | 11/2006 | |
| KR | 2011 0004366 U | | 6/2011 | |
| KR | 20180002193 U | * | 7/2018 | |
| KR | 2020180002193 U | * | 7/2018 | |
| WO | WO 2007/037962 | | 4/2007 | |
| WO | WO 2019/036243 | | 2/2019 | |
| WO | WO-2019200020 A1 | * | 10/2019 | ............. A24F 40/42 |
| WO | WO-2021045772 A1 | * | 3/2021 | ........... B29C 64/165 |
| WO | WO-2021099571 A1 | * | 5/2021 | ............. A24B 13/00 |

OTHER PUBLICATIONS

Anonymous, "E-Textiles Phone Case Design Kit | Edumi Education", Feb. 26, 2019 (Feb. 26, 2019), Retrieved from the Internet: URL:https://web.archive.org/web/20190226151 53/http://edumieducation.com/an/product/e-textiles-phone-case-design-kit/ XP055837844 [retrieved on Sep. 6, 2021].

Krajewski, A. et al.; "Piezoelectric Force Response of Novel 2D Textile Based PVDF Sensors", IEEE Sensors Journal, IEEE Service Center, New York, N.Y., U.S., vol. 13, No. 12, Dec. 1, 2013; pp. 4743-4748, XP011529232.

Kiekins et al., "Non-Wovens From Cotton Fibres for Absorbent Products Obtained by the Needle-Punching Process," AUTEX Research Journal, Dec. 2002, 2(4), 9 pp.

Pinnau et al., "Formation and Modification of Polymeric Membranes: Overview," Membrane Formation and Modification, ACS Symposium Series, American Chemical Society: Washington, DC, 1999, 22 pp.

* cited by examiner

STIMULUS-RESPONSIVE POUCH

CROSS-REFERENCE TO RELATED APPLICATIONS

This application is a continuation of International Application No. PCT/IB2020/061618, filed Dec. 8, 2020, and claims priority to U.S. Provisional Application No. 62/945,460, filed on Dec. 9, 2019, which are incorporated herein by reference in their entirety and for all purposes.

FIELD OF THE DISCLOSURE

The present disclosure generally relates to pouched products intended for human use. The pouched products are responsive to a stimulus. Such products may be configured for oral use, and may include tobacco or a product derived from tobacco, or may be tobacco-free alternatives.

BACKGROUND

Tobacco may be enjoyed in a so-called "smokeless" form. Particularly popular smokeless tobacco products are employed by inserting some form of processed tobacco or tobacco-containing formulation into the mouth of the user. Conventional formats for such smokeless tobacco products include moist snuff, snus, and chewing tobacco, which are typically formed almost entirely of particulate, granular, or shredded tobacco, and which are either portioned by the user or presented to the user in individual portions, such as in single-use pouches or sachets. Other traditional forms of smokeless products include compressed or agglomerated forms, such as plugs, tablets, or pellets. Alternative product formats, such as tobacco-containing gums and mixtures of tobacco with other plant materials, are also known. See for example, the types of smokeless tobacco formulations, ingredients, and processing methodologies set forth in U.S. Pat. No. 1,376,586 to Schwartz; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0209586 to Neilsen et al.; 2009/0065013 to Essen et al.; and 2010/0282267 to Atchley, as well as WO2004/095959 to Arnarp et al., each of which is incorporated herein by reference.

Smokeless tobacco product configurations that combine tobacco material with various binders and fillers have been proposed more recently, with example product formats including lozenges, pastilles, gels, extruded forms, and the like. See, for example, the types of products described in US Patent App. Pub. Nos. 2008/0196730 to Engstrom et al.; 2008/0305216 to Crawford et al.; 2009/0293889 to Kumar et al.; 2010/0291245 to Gao et al; 2011/0139164 to Mua et al.; 2012/0037175 to Cantrell et al.; 2012/0055494 to Hunt et al.; 2012/0138073 to Cantrell et al.; 2012/0138074 to Cantrell et al.; 2013/0074855 to Holton, Jr.; 2013/0074856 to Holton, Jr.; 2013/0152953 to Mua et al.; 2013/0274296 to Jackson et al.; 2015/0068545 to Moldoveanu et al.; 2015/0101627 to Marshall et al.; and 2015/0230515 to Lampe et al., each of which is incorporated herein by reference.

All-white snus portions are growing in popularity, and offer a discrete and aesthetically pleasing alternative to traditional snus. Such modern "white" pouched products may include a bleached tobacco or may be tobacco-free.

BRIEF SUMMARY

The present disclosure generally provides pouched products comprising a chromogenic material or an electronic component, wherein the chromogenic material and the electronic component are responsive to a stimulus.

Accordingly, in one aspect, the disclosure provides a pouched product comprising a porous pouch comprising a chromogenic material, wherein the chromogenic material is responsive to a stimulus. In some embodiments, the chromogenic material is adsorbed in the porous pouch material. In some embodiments, the chromogenic material is embedded in the porous pouch material. In some embodiments, the chromogenic material is printed on the porous pouch material. In some embodiments, the chromogenic material is covalently bound to the porous pouch material.

In some embodiments, the pouched product is configured for use as an indicator in a product storage package.

In some embodiments, the pouched product is configured for oral use, and further comprises a composition comprising one or more flavorants, active ingredients, or both.

In some embodiments, the stimulus is a change in the pH of the composition, depletion of the one or more flavorants, depletion of the one or more active ingredients, exposure to moisture, exposure to air, or exposure to mechanical compression. In some embodiments, the chromogenic material is a pH-sensitive indicator or a moisture-sensitive indicator.

In another aspect is provided a pouched product comprising a porous pouch and an electronic component responsive to a stimulus, the electronic component disposed on a portion of the porous pouch.

In some embodiments, the pouched product is configured for use as an indicator in a product package.

In some embodiments, the electronic component is in the form of a stripe adhered to a surface of the porous pouch. In some embodiments, the electronic component is printed on a surface of the porous pouch by a three-dimensional printing process.

In some embodiments, the pouched product further comprises a composition enclosed in the porous pouch, the composition comprising one or more flavorants, one or more active ingredients, or both.

In some embodiments, the pouched product further comprises an electronic tobacco heating product.

In some embodiments, the pouched product is configured for oral use.

In some embodiments, the stimulus is a change in the pH of the composition, depletion of the one or more flavorants, depletion of the one or more active ingredients, a change in the saliva concentration of a sugar, exposure to moisture, exposure to air, or exposure to mechanical compression.

In some embodiments, the pouched product further comprises electronic components configured to relay information to a portable electronic device.

In yet another aspect is provided a method of disposing an electronic component on a surface of a porous pouch, the porous pouch comprising a fleece nonwoven material, wherein the chromogenic material and the electronic component are responsive to a stimulus, the method comprising printing the electronic component on a fleece nonwoven material using a three-dimensional printing process;

In some embodiments, the method further comprises feeding the fleece nonwoven material into a pouching machine. In some embodiments, the method further comprises spacing the printing of the electronic component along the fleece nonwoven material at a distance determined by a dimension of the porous pouch. In some embodiments, the method further comprises loading the fleece nonwoven material printed with electronics onto a bobbin. In some embodiments, the method further comprises feeding the bobbin to the pouching machine.

The disclosure includes, without limitations, the following embodiments.

Embodiment 1: A pouched product comprising a porous pouch comprising a chromogenic material, wherein the chromogenic material is responsive to a stimulus.

Embodiment 2: The pouched product of embodiment 1, wherein the chromogenic material is adsorbed in the porous pouch material.

Embodiment 3: The pouched product of embodiment 1 or 2, wherein the chromogenic material is embedded in the porous pouch material.

Embodiment 4: The pouched product of any one of embodiments 1-3, wherein the chromogenic material is printed on the porous pouch material.

Embodiment 5: The pouched product of any one of embodiments 1-4, wherein the chromogenic material is covalently bound to the porous pouch material.

Embodiment 6: The pouched product of any one of embodiments 1-5, configured for use as an indicator in a product storage package.

Embodiment 7: The pouched product of any one of embodiments 1-6, configured for oral use, and further comprising a composition comprising one or more flavorants, active ingredients, or both. Embodiment 8: The pouched product of any one of embodiments 1-7, wherein the stimulus is a change in the pH of the composition, depletion of the one or more flavorants, depletion of the one or more active ingredients, exposure to moisture, exposure to air, or exposure to mechanical compression.

Embodiment 9: The pouched product of any one of embodiments 1-8, wherein the chromogenic material is a pH-sensitive indicator or a moisture-sensitive indicator.

Embodiment 10: A pouched product comprising a porous pouch and an electronic component responsive to a stimulus, the electronic component disposed on a portion of the porous pouch.

Embodiment 11: The pouched product of embodiment 10, configured for use as an indicator in a product package.

Embodiment 12: The pouched product of embodiment 10 or 11, wherein the electronic component is in the form of a stripe adhered to a surface of the porous pouch.

Embodiment 13: The pouched product of any one of embodiments 10-12, wherein the electronic component is printed on a surface of the porous pouch by a three-dimensional printing process.

Embodiment 14: The pouched product of any one of embodiments 10-13, further comprising a composition enclosed in the porous pouch, the composition comprising one or more flavorants, one or more active ingredients, or both.

Embodiment 15: The pouched product of any one of embodiments 10-14, further comprising an electronic tobacco heating product.

Embodiment 16: The pouched product of any one of embodiments 10-15, configured for oral use.

Embodiment 17: The pouched product of any one of embodiments 10-16, wherein the stimulus is a change in the pH of the composition, depletion of the one or more flavorants, depletion of the one or more active ingredients, a change in the saliva concentration of a sugar, exposure to moisture, exposure to air, or exposure to mechanical compression.

Embodiment 18: The pouched product of any one of embodiments 10-17, further comprising one or more electronic components configured to relay information to a portable electronic device.

Embodiment 19: A method of disposing an electronic component on a surface of a porous pouch, the porous pouch comprising a fleece nonwoven material, wherein the chromogenic material and the electronic component are responsive to a stimulus, the method comprising: printing the electronic component on a fleece nonwoven material using a three-dimensional printing process; and feeding the fleece nonwoven material into a pouching machine.

Embodiment 20: The method of embodiment 19, further comprising spacing the printing of the electronic component along the fleece nonwoven material at a distance determined by a dimension of the porous pouch.

Embodiment 21: The method of embodiment 19 or 20, further comprising loading the fleece nonwoven material printed with electronics onto a bobbin.

Embodiment 22: The method of embodiment 21, further comprising feeding the bobbin to the pouching machine.

Embodiment 23: The pouched product of any one of embodiments 1-18, comprising an active ingredient selected from the group consisting of a nicotine component, botanicals, nutraceuticals, stimulants, amino acids, vitamins, cannabinoids, cannabimimetics, terpenes, and combinations thereof.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWING

Having thus described aspects of the disclosure in the foregoing general terms, reference will now be made to the accompanying drawing, which is not necessarily drawn to scale. The drawing is exemplary only, and should not be construed as limiting the disclosure.

DETAILED DESCRIPTION

The present disclosure provides a pouched product comprising a material that is responsive to changes associated, e.g., with the pouched product and/or with the environment to which the pouched product is exposed (e.g., during storage or during use). Such material can comprise, e.g., a chromogenic material or an electronic component, wherein the chromogenic material and the electronic component are responsive to a stimulus. The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water). Reference to "wet weight" refers to the weight of the composition including water. Unless otherwise indicated, reference to "weight percent" of a composition reflects the total wet weight of the composition (i.e., including water).

Stimulus

In one aspect is provided a pouched product responsive to a stimulus. As used herein, reference to a "stimulus" means a change in the environment to which the pouched product is exposed, a change in the physical state of the pouched product, and/or a change in the concentration of one or more components within the pouched product. Non-limiting examples of such stimuli include a change in the pH of the composition, a change in the concentration (e.g., near depletion or complete depletion) of a flavoring, a change in the concentration (e.g., near depletion or complete depletion) of an active ingredient, exposure to moisture, exposure to air, exposure to a thermal condition, and exposure to mechanical compression.

Chromogenic Material

In some embodiments, a pouched product as provided herein comprises a porous pouch comprising a chromogenic material, wherein the chromogenic material is responsive to a stimulus. By "chromogenic" is meant a material that changes color under certain conditions (e.g., exposure to moisture, a change in pH value, and/or a change in temperature).

There are two general classes of chromogenic materials: hydrochromic and thermochromic. In some embodiments, the chromogenic material is hydrochromic (e.g., a moisture-sensitive indicator). One type of hydrochromic material changes color in response to a change in pH value. In some embodiments, the chromogenic material is a pH-sensitive indicator. The pH of human saliva is generally in the range of 6.2 to 7.6. In some embodiments, the porous pouch material is slightly basic or acidic (e.g., less than 6 or greater than 8), and is coated with a suitable pH indicator. Upon exposing the pouched product to saliva during oral use, the fleece will change color. Suitable pH indicators are known to one skilled in the art. Another form of hydrochromism occurs when a colored material exhibits a color change, e.g., appears to become transparent when exposed to moisture e.g., a water wash or saliva. Essentially, when exposed to such moisture, a colored coating associated with the hydrochromic material is washed away.

In some embodiments, the chromogenic material is thermochromic (e.g., a temperature-sensitive indicator). There are two common types of thermochromic materials: liquid crystals and leuco dyes, although the disclosure is not limited thereto. Either of these types of materials may be incorporated within the pouched products as disclosed herein, for example, within the disclosed pouched products. These thermochromic materials can be incorporated in various ways, e.g., within the fibers comprising the porous pouch material, or applied as a coating to a surface of the porous pouch material. Some liquid crystals are capable of displaying different colors at different temperatures. This change is dependent on selective reflection of certain wavelengths by the crystalline structure of the material, as it changes between the low-temperature crystalline phase, through an anisotropic chiral or twisted nematic phase, to the high-temperature isotropic liquid phase. Only the nematic mesophase has thermochromic properties; this restricts the effective temperature range of the material. The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength.

Liquid crystal materials are generally of three types: cholosteric (formulations containing cholesterol and sterol), chiral nematic (non-sterol formulations), and combinations of the two. These materials can produce a range of colors based on temperature. The color of the thermochromic liquid crystal can continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state. Some such materials are cholesteryl nonanoate, cholesteryl oleyl carbonate, cholesteryl benzoate, and cyanobiphenyls. Two or more thermochromic materials may be mixed to give the desired color change at the desired temperature. In one non-limiting example, the pouch material may be incorporated with different liquid crystal compounds with the following color pallet: dark blue at temperatures below 0° C., green below 35° C., and red below 50° C.

Thermochromic dyes based on leuco dyes display a color change (usually between the colorless leuco form and the colored form) dependent on temperature. Leuco dyes typically have less accurate temperature response than liquid crystals. They are usually used in combination with some other pigment, which are incorporated in certain embodiments provided herein, producing a color change between the color of the base pigment and the color of the pigment combined with the color of the non-leuco form of the leuco dye. Organic leuco dyes are available for temperature ranges between about −5° C. (23° F.) and 60° C. (140° F.), in a wide range of colors. Typically, thermochromic dyes are utilized in a micro-encapsulated form, combining a leuco dye with a weak acid, such that under certain temperature conditions, the dye and weak acid interact to produce a color change. The color change usually happens in a 3° C. (5.4° F.) interval. The dyes most commonly used are spirolactones, fluorans, spiropyrans, and fulgides. The weak acids may include, but are not limited to, bisphenol A, parabens, 1,2,3-triazole derivatives, and 4-hydroxycoumarin, which act as proton donors, changing the dye molecule between its leuco form and its protonated colored form; stronger acids would make the change irreversible.

In any of the above embodiments, the chromogenic material may be associated with the pouched product in various ways. For example, the chromogenic material can be adsorbed in the porous pouch material, embedded in the porous pouch material, covalently bound to the porous pouch material, or printed on the porous pouch material. The chromogenic material may be included in a composition comprising one or more flavorants, active ingredients, or both, as described herein below. For example, the chromogenic material may be encapsulated and combined with the flavorant or active ingredient which may be present, such that upon contact with saliva in the mouth of a user, the capsule disintegrates, producing a color change in the composition, the pouch, or both.

Electronic Component

In another aspect is provided a pouched product comprising a porous pouch comprising an electronic component responsive to a stimulus. The electronic component may be configured to respond to a variety of stimuli, including, but not limited to, moisture, temperature, glucose concentration, pH, and concentration of one or more active ingredients or flavorings. The electronic component may measure, for example, a change in resistance, capacitance, current, or voltage associated with the stimulus and convert this change to an electrical signal. Appropriate electronic components and circuitry are known, and include, for example, thermistors, amperometric or other electrochemical cells, integrated circuit (IC) temperature transducers, thermocouples, field effect transistors, (e.g., biosensor metal oxide semiconductor field effect transistors (MOSFETs), ion-sensitive field-effect transistors (ISFETs), and the like, bilayer membranes, and piezoelectrics.

In some embodiments, the electronic component is in the form of a stripe adhered to a surface of the porous pouch. In certain embodiments, the electronic component is printed on a surface of the porous pouch e.g., by a three-dimensional printing process. For example, the electronic component can be pre-printed on a fleece nonwoven material. The fleece nonwoven material printed with the electronic component may then be loaded onto a bobbin, and the bobbin fed into a pouching machine employed to produce pouched products according to various embodiments of the disclosure.

Accordingly, in another aspect is provided a method of disposing an electronic component on a surface of a porous pouch, the porous pouch comprising a fleece nonwoven material, wherein the electronic component is responsive to a stimulus, the method comprising printing the electronic component on the fleece nonwoven material using a three-dimensional printing process. In some embodiments, the method further comprises loading the fleece nonwoven material printed with the electronic component onto a bobbin. In some embodiments, the method further comprises feeding the bobbin into a pouching machine. When the strip of fleece nonwoven fabric is fed through a traditional pouch maker, the resultant pouch would contain a thin line of the electronic component. The electronic component can be spaced to coincide with standard pouch sizes (i.e., so that fleece is cut at regular intervals during pouching and the electronic component is carried by each formed pouch).

Any suitable method for three-dimensional printing may be utilized, such as those employed for printing conductive inks onto textiles. Such methods are known in the art and are disclosed in, for example, U.S. Pat. No. 10,064,270 and U.S. Patent Application Publication No. 2019/0297960 both to Jur et al., each of which is incorporated by reference herein in its entirety.

In some embodiments, the pouched product is configured for use as an indicator in a product storage package, for example, to indicate exposure to high or low temperature conditions, moisture, air, or to monitor product quality.

In some embodiments, the pouched product further comprises one or more electronic components configured to relay information to a portable electronic device. In such embodiments, the pouched product may be capable of providing feedback, such as feedback on user biometrics during use of the product, or of providing feedback on the oral environment during use of the product (change in concentration of glucose in blood or saliva, pH, temperature, depletion of a flavorant or active ingredient, and the like). Non-limiting examples of such electronic components include a printed battery and circuitry to allow connection with Bluetooth or WiFi enabled devices, and other modalities of wireless communication (e.g., radio frequency identification (RFID), high frequency RFID (near field communication; NFC), infrared, microwave, ZigBee, satellite, WiMax, and BLE).

In some embodiments, the pouched products as disclosed herein are configured for oral use, and further comprise a composition comprising one or more flavorants, active ingredients, or both. The individual components of such compositions are described further herein below.

Flavorant

In some embodiments, the composition comprises a flavorant. As used herein, a "flavorant" or "flavoring agent" is any flavorful or aromatic substance capable of altering the sensory characteristics associated with the composition and/or with an oral product incorporating such a composition. Examples of sensory characteristics that can be modified by the flavoring agent include taste, mouthfeel, moistness, coolness/heat, and/or fragrance/aroma. Flavoring agents may be natural or synthetic, and the character of the flavors imparted thereby may be described, without limitation, as fresh, sweet, herbal, confectionary, floral, fruity, or spicy. Specific types of flavors include, but are not limited to, vanilla, coffee, chocolate/cocoa, cream, mint, spearmint, menthol, peppermint, wintergreen, eucalyptus, lavender, cardamom, nutmeg, cinnamon, clove, cascarilla, sandalwood, honey, jasmine, ginger, anise, sage, licorice, lemon, orange, apple, peach, lime, cherry, strawberry, trigeminal sensates, terpenes, and any combinations thereof. See also, Leffingwell et al., Tobacco Flavoring for Smoking Products, R. J. Reynolds Tobacco Company (1972), which is incorporated herein by reference. Flavorings also may include components that are considered moistening, cooling or smoothening agents, such as eucalyptus. These flavors may be provided neat (i.e., alone) or in a composite, and may be employed as concentrates or flavor packages (e.g., spearmint and menthol, orange and cinnamon; lime, pineapple, and the like). Representative types of components also are set forth in U.S. Pat. No. 5,387,416 to White et al.; US Pat. App. Pub. No. 2005/0244521 to Strickland et al.; and PCT Application Pub. No. WO 05/041699 to Quinter et al., each of which is incorporated herein by reference. In some instances, the flavoring agent may be provided in a spray-dried form or a liquid form.

The amount of flavorant utilized in the composition can vary, but is typically up to about 10 weight percent, and certain embodiments are characterized by a flavoring agent content of at least about 0.1 weight percent, such as about 0.5 to about 10 weight percent, about 1 to about 6 weight percent, or about 2 to about 5 weight percent, based on the total weight of the composition.

Active Ingredient

The pouched product as disclosed herein may include one or more active ingredients. As used herein, an "active ingredient" refers to one or more substances belonging to any of the following categories: API (active pharmaceutical substances), food additives, natural medicaments, and naturally occurring substances that can have an effect on humans. Example active ingredients include any ingredient known to impact one or more biological functions within the body, such as ingredients that furnish pharmacological activity or other direct effect in the diagnosis, cure, mitigation, treatment, or prevention of disease, or which affect the structure or any function of the body of humans (e.g., provide a stimulating action on the central nervous system, have an energizing effect, an antipyretic or analgesic action, or an otherwise useful effect on the body). In some embodiments, the active ingredient may be of the type generally referred to as dietary supplements, nutraceuticals, "phytochemicals" or "functional foods". These types of additives are sometimes defined in the art as encompassing substances typically available from naturally-occurring sources (e.g., botanical materials) that provide one or more advantageous biological effects (e.g., health promotion, disease prevention, or other medicinal properties), but are not classified or regulated as drugs.

Non-limiting examples of active ingredients include those falling in the categories of botanical ingredients (e.g., hemp, lavender, peppermint, eucalyptus, rooibos, fennel, cloves, chamomile, basil, rosemary, clove, citrus, ginger, cannabis, ginseng, maca, and tisanes), stimulants (e.g., caffeine or guarana), amino acids (e.g., taurine, theanine, phenylalanine, tyrosine, and tryptophan), vitamins (e.g., B6, B12, and C), antioxidants, nicotine components, pharmaceutical ingredients (e.g., nutraceutical and medicinal ingredients), cannabinoids (e.g., tetrahydrocannabinol (THC) or cannabidiol (CBD)) and/or melatonin.. Each of these categories is further described herein below. The particular choice of active ingredients will vary depending upon the desired flavor, texture, and desired characteristics of the particular product.

The particular percentages of active ingredients present will vary depending upon the desired characteristics of the particular product. Typically, an active ingredient or combination thereof is present in a total concentration of at least about 0.001% by weight of the composition, such as in a range from about 0.001% to about 20%. In some embodiments, the active ingredient or combination of active ingredients is present in a concentration from about 0.1% w/w to about 10% by weight, such as, e.g., from about 0.5% w/w to about 10%, from about 1% to about 10%, from about 1% to about 5% by weight, based on the total weight of the composition. In some embodiments, the active ingredient or combination of active ingredients is present in a concentration of from about 0.001%, about 0.01%, about 0.1%, or about 1%, up to about 20% by weight, such as, e.g., from about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight, based on the total weight of the composition. Further suitable ranges for specific active ingredients are provided herein below.

Botanical

In some embodiments, the active ingredient comprises a botanical ingredient. As used herein, the term "botanical ingredient" or "botanical" refers to any plant material or fungal-derived material, including plant material in its natural form and plant material derived from natural plant materials, such as extracts or isolates from plant materials or treated plant materials (e.g., plant materials subjected to heat treatment, fermentation, bleaching, or other treatment processes capable of altering the physical and/or chemical nature of the material). For the purposes of the present disclosure, a "botanical" includes, but is not limited to, "herbal materials," which refer to seed-producing plants that do not develop persistent woody tissue and are often valued for their medicinal or sensory characteristics (e.g., teas or tisanes). Reference to botanical material as "non-tobacco" is intended to exclude tobacco materials (i.e., does not include any *Nicotiana* species).

When present, a botanical is typically at a concentration of from about 0.01% w/w to about 10% by weight, such as, e.g., from about 0.01% w/w, about 0.05%, about 0.1%, or about 0.5%, to about 1%, about 2%, about 3%, about 4%, about 5%, about 6%, about 7%, about 8%, about 9%, or about 10%, about 11%, about 12%, about 13%, about 14%, or about 15% by weight, based on the total weight of the composition.

The botanical materials useful in the present disclosure may comprise, without limitation, any of the compounds and sources set forth herein, including mixtures thereof. Certain botanical materials of this type are sometimes referred to as dietary supplements, nutraceuticals, "phytochemicals" or "functional foods." Certain botanicals, as the plant material or an extract thereof, have found use in traditional herbal medicine, and are described further herein. Non-limiting examples of botanicals or botanical-derived materials include hemp, eucalyptus, rooibos, fennel, citrus, cloves, lavender, peppermint, chamomile, basil, rosemary, ginger, turmeric, green tea, white mulberry, cannabis, cocoa, ashwagandha, baobab, chlorophyll, cordyceps, damiana, ginseng, guarana, and maca. In some embodiments, the composition comprises green tea, turmeric, and white mulberry.

Ashwagandha (*Withania somnifera*) is a plant in the Solanaceae (nightshade) family. As an herb, Ashwagandha has found use in the Indian Ayurvedic system of medicine, where it is also known as "Indian Winter cherry" or "Indian Ginseng." In some embodiments, the active ingredient comprises ashwagandha.

Baobab is the common name of a family of deciduous trees of the genus *Adansonia*. The fruit pulp and seeds of the Baobab are consumed, generally after drying, as a food or nutritional supplement. In some embodiments, the active ingredient comprises baobab.

Chlorophyll is any of several related green pigments found in the mesosomes of cyanobacteria, as well as in the chloroplasts of algae and plants. Chlorophyll has been used as a food additive (colorant) and a nutritional supplement. Chlorophyll may be provided either from native plant materials (e.g., botanicals) or in an extract or dried powder form. In some embodiments, the active ingredient comprises chlorophyll.

*Cordyceps* is a diverse genus of ascomycete (sac) fungi which are abundant in humid temperate and tropical forests. Members of the *cordyceps* family are used extensively in traditional Chinese medicine. In some embodiments, the active ingredient comprises *cordyceps*.

Damiana is a small, woody shrub of the family Passifloraceae. It is native to southern Texas, Central America, Mexico, South America, and the Caribbean. Damiana produces small, aromatic flowers, followed by fruits that taste similar to figs. The extract from damiana has been found to suppress aromatase activity, including the isolated compounds pinocembrin and acacetin. In some embodiments, the active ingredient comprises damiana.

Guarana is a climbing plant in the family Sapindaceae, native to the Amazon basin. The seeds from its fruit, which are about the size of a coffee bean, have a high concentration of caffeine and, consequently, stimulant activity. In some embodiments, the active ingredient comprises guarana. In some embodiments, the active ingredient comprises guarana, honey, and ashwagandha.

Ginseng is the root of plants of the genus *Panax*, which are characterized by the presence of unique steroid saponin phytochemicals (ginsenosides) and gintonin. Ginseng finds use as a dietary supplement in energy drinks or herbal teas, and in traditional medicine. Cultivated species include Korean ginseng (*P. ginseng*), South China ginseng (*P. notoginseng*), and American ginseng (*P. quinquefolius*). American ginseng and Korean ginseng vary in the type and quantity of various ginsenosides present. In some embodiments, the active ingredient comprises ginseng. In some embodiments, the ginseng is American ginseng or Korean ginseng. In specific embodiments, the active ingredient comprises Korean ginseng.

Maca is a plant that grows in central Peru in the high plateaus of the Andes Mountains. It is a relative of the radish, and has an odor similar to butterscotch. Maca has been used in traditional (e.g., Chinese) medicine. In some embodiments, the active ingredient comprises maca.

Stimulants

In some embodiments, the active ingredient comprises one or more stimulants. As used herein, the term "stimulant" refers to a material that increases activity of the central nervous system and/or the body, for example, enhancing focus, cognition, vigor, mood, alertness, and the like. Non-limiting examples of stimulants include caffeine, theacrine, theobromine, and theophylline. Theacrine (1,3,7,9-tetramethyluric acid) is a purine alkaloid which is structurally related to caffeine, and possesses stimulant, analgesic, and anti-inflammatory effects. Present stimulants may be natural, naturally derived, or wholly synthetic. For example, certain botanical materials (guarana, tea, coffee, cocoa, and the like) may possess a stimulant effect by virtue of the presence of e.g., caffeine or related alkaloids, and accordingly are "natural" stimulants. By "naturally derived" is meant the stimulant (e.g., caffeine, theacrine) is in a purified form, outside its natural (e.g., botanical) matrix. For example, caffeine can be obtained by extraction and purification from botanical sources (e.g., tea). By "wholly synthetic", it is meant that the stimulant has been obtained by chemical synthesis.

When present, a stimulant or combination of stimulants (e.g., caffeine, theacrine, and combinations thereof) is typically at a concentration of from about 0.1% w/w to about 15% by weight, such as, e.g., from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, or about 15% by weight, based on the total weight of the composition.

In some embodiments, the active ingredient comprises caffeine. In some embodiments, the active ingredient comprises theacrine. In some embodiments, the active ingredient comprises a combination of caffeine and theacrine.

Amino Acids

In some embodiments, the active ingredient comprises an amino acid. As used herein, the term "amino acid" refers to an organic compound that contains amine (—NH$_2$) and carboxyl (—COOH) or sulfonic acid (SO$_3$H) functional groups, along with a side chain (R group), which is specific to each amino acid. Amino acids may be proteinogenic or non-proteinogenic. By "proteinogenic" is meant that the amino acid is one of the twenty naturally occurring amino acids found in proteins. The proteinogenic amino acids include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine. By "non-proteinogenic" is meant that either the amino acid is not found naturally in protein, or is not directly produced by cellular machinery (e.g., is the product of post-tranlational modification). Non-limiting examples of non-proteinogenic amino acids include gamma-aminobutyric acid (GABA), taurine (2-aminoethanesulfonic acid), theanine (L-γ-glutamylethylamide), hydroxyproline, and beta-alanine.

When present, an amino acid or combination of amino acids (e.g., taurine, theanine, and combinations thereof) is typically at a concentration of from about 0.1% w/w to about 15% by weight, such as, e.g., from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, or about 15% by weight, based on the total weight of the composition.

In some embodiments, the amino acid is taurine, theanine, phenylalanine, tyrosine, tryptophan, or a combination thereof. In some embodiments, the amino acid is taurine. In some embodiments, the active ingredient comprises a combination of taurine and caffeine. In some embodiments, the active ingredient comprises a combination of taurine, caffeine, and guarana. In some embodiments, the active ingredient comprises a combination of taurine, maca, and *cordyceps*. In some embodiments, the active ingredient comprises a combination of theanine and caffeine.

Vitamins

In some embodiments, the active ingredient comprises a vitamin or combination of vitamins. As used herein, the term "vitamin" refers to an organic molecule (or related set of molecules) that is an essential micronutrient needed for the proper functioning of metabolism in a mammal. There are thirteen vitamins required by human metabolism, which are: vitamin A (as all-trans-retinol, all-trans-retinyl-esters, as well as all-trans-beta-carotene and other provitamin A carotenoids), vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid or folate), vitamin B12 (cobalamins), vitamin C (ascorbic acid), vitamin D (calciferols), vitamin E (tocopherols and tocotrienols), and vitamin K (quinones).

When present, a vitamin or combination of vitamins (e.g., vitamin B6, vitamin B12, vitamin E, vitamin C, or a combination thereof) is typically at a concentration of from about 0.01% w/w to about 1% by weight, such as, e.g., from about 0.01%, about 0.02%, about 0.03%, about 0.04%, about 0.05%, about 0.06%, about 0.07%, about 0.08%, about 0.09%, or about 0.1% w/w, to about 0.2%, about 0.3%, about 0.4%, about 0.5% about 0.6%, about 0.7%, about 0.8%, about 0.9%, or about 1% by weight, based on the total weight of the composition.

In some embodiments, the vitamin is vitamin B6, vitamin B12, vitamin E, vitamin C, or a combination thereof. In some embodiments, the active ingredient comprises a combination of vitamin B6, caffeine, and theanine. In some embodiments, the active ingredient comprises vitamin B6, vitamin B12, and taurine. In some embodiments, the active ingredient comprises a combination of vitamin B6, vitamin B12, ginseng, and theanine. In some embodiments, the active ingredient comprises a combination of vitamin C, baobab, and chlorophyll.

In certain embodiments, the active ingredient is selected from the group consisting of caffeine, taurine, GABA, theanine, vitamin C, lemon balm extract, ginseng, citicoline, sunflower lecithin, and combinations thereof. For example, the active ingredient can include a combination of caffeine, theanine, and optionally ginseng. In another embodiment, the active ingredient includes a combination of theanine, gamma-amino butyric acid (GABA), and lemon balm extract. In a further embodiment, the active ingredient includes theanine, theanine and tryptophan, or theanine and one or more B vitamins (e.g., vitamin B6 or B12). In a still further embodiment, the active ingredient includes a combination of caffeine, taurine, and vitamin C.

Antioxidants

In some embodiments, the active ingredient comprises one or more antioxidants. As used herein, the term "antioxidant" refers to a substance which prevents or suppresses oxidation by terminating free radical reactions, and may delay or prevent some types of cellular damage. Antioxidants may be naturally occurring or synthetic. Naturally occurring antioxidants include those found in foods and botanical materials. Non-limiting examples of antioxidants include certain botanical materials, vitamins, polyphenols, and phenol derivatives.

Examples of botanical materials which are associated with antioxidant characteristics include without limitation acai berry, alfalfa, allspice, annatto seed, apricot oil, basil, bee balm, wild bergamot, black pepper, blueberries, borage seed oil, bugleweed, cacao, calamus root, catnip, catuaba, cayenne pepper, chaga mushroom, chervil, cinnamon, dark chocolate, potato peel, grape seed, ginseng, gingko biloba, Saint John's Wort, saw palmetto, green tea, black tea, black cohosh, cayenne, chamomile, cloves, cocoa powder, cranberry, dandelion, grapefruit, honeybush, echinacea, garlic, evening primrose, feverfew, ginger, goldenseal, hawthorn, hibiscus flower, jiaogulan, kava, lavender, licorice, marjoram, milk thistle, mints (menthe), oolong tea, beet root, orange, oregano, papaya, pennyroyal, peppermint, red clover, rooibos (red or green), rosehip, rosemary, sage, clary sage, savory, spearmint, spirulina, slippery elm bark, sorghum bran hi-tannin, sorghum grain hi-tannin, sumac bran, comfrey leaf and root, goji berries, gutu kola, thyme, turmeric, uva ursi, valerian, wild yam root, wintergreen, yacon root, yellow dock, yerba mate, yerba santa, bacopa monniera, withania somnifera, Lion's mane, and silybum marianum. Such botanical materials may be provided in fresh or dry form, essential oils, or may be in the form of an extracts. The botanical materials (as well as their extracts) often include compounds from various classes known to provide antioxidant effects, such as minerals, vitamins, isoflavones, phytoesterols, allyl sulfides, dithiolthiones, isothiocyanates, indoles, lignans, flavonoids, polyphenols, and carotenoids. Examples of compounds found in botanical extracts or oils include ascorbic acid, peanut endocarb, resveratrol, sulforaphane, beta-carotene, lycopene, lutein, co-enzyme Q, carnitine, quercetin, kaempferol, and the like. See, e.g., Santhosh et al., Phytomedicine, 12(2005) 216-220, which is incorporated herein by reference.

Non-limiting examples of other suitable antioxidants include citric acid, Vitamin E or a derivative thereof, a tocopherol, epicatechol, epigallocatechol, epigallocatechol gallate, erythorbic acid, sodium erythorbate, 4-hexylresorcinol, theaflavin, theaflavin monogallate A or B, theaflavin digallate, phenolic acids, glycosides, quercitrin, isoquercitrin, hyperoside, polyphenols, catechols, resveratrols, oleuropein, butylated hydroxyanisole (BHA), butylated hydroxytoluene (BHT), tertiary butylhydroquinone (TBHQ), and combinations thereof. In some embodiments, the antioxidant is Vitamin E or a derivative thereof, a flavonoid, a polyphenol, a carotenoid, or a combination thereof.

When present, an antioxidant is typically at a concentration of from about 0.001% w/w to about 10% by weight, such as, e.g., from about 0.001%, about 0.005%, about 0.01% w/w, about 0.05%, about 0.1%, or about 0.5%, to about 1%, about 2%, about 3%, about 4%, about 5%, about 6%, about 7%, about 8%, about 9%, or about 10%, based on the total weight of the composition.

Nicotine Component

In certain embodiments, a nicotine component may be included in the composition. By "nicotine component" is meant any suitable form of nicotine (e.g., free base or salt) for providing oral absorption of at least a portion of the nicotine present. Typically, the nicotine component is selected from the group consisting of nicotine free base and a nicotine salt. In some embodiments, nicotine is in its free base form, which easily can be adsorbed in for example, a microcrystalline cellulose material to form a microcrystalline cellulose-nicotine carrier complex. See, for example, the discussion of nicotine in free base form in US Pat. Pub. No. 2004/0191322 to Hansson, which is incorporated herein by reference. As such, in some embodiments, a composition is provided comprising a MCC-nicotine carrier complex.

In some embodiments, at least a portion of the nicotine can be employed in the form of a salt. Salts of nicotine can be provided using the types of ingredients and techniques set forth in U.S. Pat. No. 2,033,909 to Cox et al. and Perfetti, *Beitrage Tabakforschung Int.*, 12: 43-54 (1983), which are incorporated herein by reference. Further salts are disclosed in, for example, U.S. Pat. No. 9,738,622 to Dull et al., and US Pat. Pub. Nos. 2018/0230126 to Dull et al., 2016/0185750 to Dull et al., and 2018/0051002 to Dull et al., each of which is incorporated herein by reference. Additionally, salts of nicotine are available from sources such as Pfaltz and Bauer, Inc. and K&K Laboratories, Division of ICN Biochemicals, Inc. Typically, the nicotine component is selected from the group consisting of nicotine free base, a nicotine salt such as hydrochloride, dihydrochloride, monotartrate, bitartrate, sulfate, salicylate, and nicotine zinc chloride.

In some embodiments, at least a portion of the nicotine can be in the form of a resin complex of nicotine, where nicotine is bound in an ion-exchange resin, such as nicotine polacrilex, which is nicotine bound to, for example, a polymethacrilic acid, such as Amberlite IRP64, Purolite C115HMR, or Doshion P551. See, for example, U.S. Pat. No. 3,901,248 to Lichtneckert et al., which is incorporated herein by reference. Another example is a nicotine-polyacrylic carbomer complex, such as with Carbopol 974P. In some embodiments, nicotine may be present in the form of a nicotine polyacrylic complex.

Typically, the nicotine component (calculated as the free base) when present, is in a concentration of at least about 0.001% by weight of the composition, such as in a range from about 0.001% to about 10%. In some embodiments, the nicotine component is present in a concentration from about 0.1% w/w to about 10% by weight, such as, e.g., from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, or about 10% by weight, calculated as the free base and based on the total weight of the composition. In some embodiments, the nicotine component is present in a concentration from about 0.1% w/w to about 3% by weight, such as, e.g., from about 0.1% w/w to about 2.5%, from about 0.1% to about 2.0%, from about 0.1% to about 1.5%, or from about 0.1% to about 1% by weight, calculated as the free base and based on the total weight of the composition. These ranges can also apply to other active ingredients noted herein.

In some embodiments, the composition of the disclosure can be characterized as completely free or substantially free of nicotine. For example, certain embodiments can be characterized as having less than 0.1% by weight, or less than 0.01% by weight, or less than 0.001% by weight of a nicotine component, or 0% by weight of a nicotine component.

Cannabinoids

In some embodiments, the active ingredient comprises one or more cannabinoids. As used herein, the term "cannabinoid" refers to a class of diverse chemical compounds that acts on cannabinoid receptors, also known as the endocannabinoid system, in cells that alter neurotransmitter release in the brain. Ligands for these receptor proteins include the endocannabinoids produced naturally in the body by animals; phytocannabinoids, found in cannabis; and synthetic cannabinoids, manufactured artificially. Cannabinoids found in cannabis include, without limitation: cannabigerol (CBG), cannabichromene (CBC), cannabidiol (CBD), tetrahydrocannabinol (THC), cannabinol (CBN), cannabinodiol (CBDL), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabinerolic acid, cannabidiolic acid (CBDA), cannabinol propyl variant (CBNV), cannabitriol (CBO), tetrahydrocannabinolic acid (THCA), and tetrahydrocannabivarinic acid (THCV A). In certain embodiments, the cannabinoid is selected from tetrahydrocannabinol (THC), the primary psychoactive compound in cannabis, and cannabidiol (CBD) another major constituent of the plant, but which is devoid of psychoactivity. All of the above compounds can be used in the form of an isolate from plant material or synthetically derived.

Alternatively, the active ingredient can be a cannabimimetic, which is a class of compounds derived from plants other than cannabis that have biological effects on the endocannabinoid system similar to cannabinoids. Examples include yangonin, alpha-amyrin or beta-amyrin (also classified as terpenes), cyanidin, curcumin (tumeric), catechin, quercetin, salvinorin A, N-acylethanolamines, and N-alkylamide lipids.

When present, a cannabinoid (e.g., CBD) or cannabimimetic is typically in a concentration of at least about 0.1% by weight of the composition, such as in a range from about 0.1% to about 30%, such as, e.g., from about 0.1%, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 15%, about 20%, or about 30% by weight, based on the total weight of the composition.

Terpenes

Active ingredients suitable for use in the present disclosure can also be classified as terpenes, many of which are associated with biological effects, such as calming effects. Terpenes are understood to have the general formula of $(C_5H_8)_n$ and include monoterpenes, sesquiterpenes, and diterpenes. Terpenes can be acyclic, monocyclic or bicyclic in structure. Some terpenes provide an entourage effect when used in combination with cannabinoids or cannabimimetics. Examples include beta-caryophyllene, linalool, limonene, beta-citronellol, linalyl acetate, pinene (alpha or beta), geraniol, carvone, eucalyptol, menthone, iso-menthone, piperitone, myrcene, beta-bourbonene, and germacrene, which may be used singly or in combination.

Pharmaceutical Ingredients

The pharmaceutical ingredient can be any known agent adapted for therapeutic, prophylactic, or diagnostic use. These can include, for example, synthetic organic compounds, proteins and peptides, polysaccharides and other sugars, lipids, inorganic compounds, and nucleic acid sequences, having therapeutic, prophylactic, or diagnostic activity. Non-limiting examples of pharmaceutical ingredients include analgesics and antipyretics (e.g., acetylsalicylic acid, acetaminophen, 3-(4-isobutylphenyl)propanoic acid).

Further Components

In some embodiments, the composition as disclosed herein may further comprise additional components, and/or the composition may be combined with additional components to form a composition configured for oral use. The additional components may comprise one or more fillers, binders, buffering agents, colorants, salts, sweeteners, fillers, binders, humectants, tobacco material, oral care additives, other additives, or a combination thereof. Each of these additional components is further described herein below.

Fillers

The composition as described herein may include a filler. Fillers may fulfill multiple functions, such as enhancing certain organoleptic properties such as texture and mouthfeel, enhancing cohesiveness or compressibility of the product, and the like, depending on the product. Generally, the filler is a porous particulate material and is cellulose-based. For example, fillers are any non-tobacco plant material or derivative thereof, including cellulose materials derived from such sources. Examples of cellulosic non-tobacco plant material include cereal grains (e.g., maize, oat, barley, rye, buckwheat, and the like), sugar beet (e.g., FIBREX® brand filler available from International Fiber Corporation), bran fiber, and mixtures thereof. Non-limiting examples of derivatives of non-tobacco plant material include starches (e.g., from potato, wheat, rice, corn), natural cellulose, and modified cellulosic materials. Additional examples of potential fillers include maltodextrin, dextrose, calcium carbonate, calcium phosphate, lactose, mannitol, xylitol, and sorbitol. Combinations of fillers can also be used.

"Starch" as used herein may refer to pure starch from any source, modified starch, or starch derivatives. Starch is present, typically in granular form, in almost all green plants and in various types of plant tissues and organs (e.g., seeds, leaves, rhizomes, roots, tubers, shoots, fruits, grains, and stems). Starch can vary in composition, as well as in granular shape and size. Often, starch from different sources has different chemical and physical characteristics. A specific starch can be selected for inclusion in the composition based on the ability of the starch material to impart a specific organoleptic property to composition. Starches derived from various sources can be used. For example, major sources of starch include cereal grains (e.g., rice, wheat, and maize) and root vegetables (e.g., potatoes and cassava). Other examples of sources of starch include acorns, arrowroot, arracacha, bananas, barley, beans (e.g., favas, lentils, mung beans, peas, chickpeas), breadfruit, buckwheat, canna, chestnuts, colacasia, katakuri, kudzu, malanga, millet, oats, oca, Polynesian arrowroot, sago, sorghum, sweet potato, quinoa, rye, tapioca, taro, tobacco, water chestnuts, and yams. Certain starches are modified starches. A modified starch has undergone one or more structural modifications, often designed to alter its high heat properties. Some starches have been developed by genetic modifications, and are considered to be "genetically modified" starches. Other starches are obtained and subsequently modified by chemical, enzymatic, or physical means. For example, modified starches can be starches that have been subjected to chemical reactions, such as esterification, etherification, oxidation, depolymerization (thinning) by acid catalysis or oxidation in the presence of base, bleaching, transglycosylation and depolymerization (e.g., dextrinization in the presence of a catalyst), cross-linking, acetylation, hydroxypropylation, and/or partial hydrolysis. Enzymatic treatment includes subjecting native starches to enzyme isolates or concentrates, microbial enzymes, and/or enzymes native to plant materials, e.g., amylase present in corn kernels to modify corn starch. Other starches are modified by heat treatments, such as pregelatinization, dextrinization, and/or cold water swelling processes. Certain modified starches include monostarch phosphate, distarch glycerol, distarch phosphate esterified with sodium trimetaphosphate, phosphate distarch phosphate, acetylated distarch phosphate, starch acetate esterified with acetic anhydride, starch acetate esterified with vinyl acetate, acetylated distarch adipate, acetylated distarch glycerol, hydroxypropyl starch, hydroxypropyl distarch glycerol, and starch sodium octenyl succinate.

In some embodiments, the filler is a cellulose material or cellulose derivative. One particularly suitable filler for use in the compositions described herein is microcrystalline cellulose ("MCC"). The mcc may be synthetic or semi-synthetic, or it may be obtained entirely from natural celluloses. The MCC may be selected from the group consisting of AVICEL® grades PH-100, PH-102, PH-103, PH-105, PH-112, PH-113, PH-200, PH-300, PH-302, VIVACEL® grades 101, 102, 12, 20 and EMOCEL® grades 50M and 90M, and the like, and mixtures thereof. In one embodiment, the composition comprises MCC as the filler.

The amount of filler can vary, but when present, is typically up to about 75 percent by weight of the composition, based on the total weight of the composition. A typical range of filler (e.g., MCC) within the composition can be from about 10 to about 75 percent by total weight of the composition, for example, from about 10, about 15, about 20, about 25, or about 30, to about 35, about 40, about 45, or about 50 weight percent (e.g., about 20 to about 50 weight percent or about 25 to about 45 weight percent). In certain embodiments, the amount of filler is at least about 10 percent by weight, such as at least about 20 percent, or at least about 25 percent, or at least about 30 percent, or at least about 35 percent, or at least about 40 percent, based on the total weight of the composition.

Binders

A binder (or combination of binders) may be employed in certain embodiments, in amounts sufficient to provide the desired physical attributes and physical integrity to the composition, and binders also often function as thickening or gelling agents. Typical binders can be organic or inorganic, or a combination thereof. Representative binders include cellulose derivatives (e.g., cellulose ethers), povidone, sodium alginate, starch-based binders, pectin, gums, carrageenan, pullulan, zein, and the like, and combinations thereof. In some embodiments, the binder comprises pectin or carrageenan or combinations thereof.

The amount of binder utilized in the composition can vary, but is typically up to about 30 weight percent, and certain embodiments are characterized by a binder content of at least about 0.1% by weight, such as about 1 to about 30% by weight, or about 5 to about 10% by weight, based on the total weight of the composition.

In one embodiment, the binder comprises a cellulose derivative. In certain embodiments, the cellulose derivative is a cellulose ether (including carboxyalkyl ethers), meaning a cellulose polymer with the hydrogen of one or more hydroxyl groups in the cellulose structure replaced with an alkyl, hydroxyalkyl, or aryl group. Non-limiting examples of such cellulose derivatives include methylcellulose, hydroxypropylcellulose ("HPC"), hydroxypropylmethylcellulose ("HPMC"), hydroxyethyl cellulose, and carboxymethylcellulose ("CMC"). In one embodiment, the cellulose derivative is one or more of methylcellulose, HPC, HPMC, hydroxyethyl cellulose, and CMC. In one embodiment, the cellulose derivative is HPC. In one embodiment, the cellulose derivative is a combination of HPC and HPMC. In some embodiments, the composition comprises from about 1 to about 10% of the cellulose derivative by weight, based on the total weight of the composition, with certain embodiments comprising about 1 to about 5% by weight of cellulose derivative, for example, from about 1%, about 2%, or about 3%, to about 4%, or about 5% by weight of the composition.

In certain embodiments, the binder includes a gum, for example, a natural gum. As used herein, a natural gum refers to polysaccharide materials of natural origin that have binding properties, and which are also useful as a thickening or gelling agents. Representative natural gums derived from plants, which are typically water soluble to some degree, include xanthan gum, guar gum, gum arabic, ghatti gum, gum tragacanth, karaya gum, locust bean gum, gellan gum, and combinations thereof. When present, natural gum binder materials are typically present in an amount of up to about 5% by weight, for example, from about 0.1, about 0.2, about 0.3, about 0.4, about 0.5, about 0.6, about 0.7, about 0.8, about 0.9, or about 1%, to about 2, about 3, about 4, or about 5% by weight, based on the total weight of the composition.

Salts

In some embodiments, the composition according to the disclosure comprises a salt (e.g., an alkali metal salt), typically employed in an amount sufficient to provide desired sensory attributes to the composition. Non-limiting examples of suitable salts include sodium chloride, potassium chloride, ammonium chloride, flour salt, sodium acetate, sodium citrate, and the like. When present, a representative amount of salt is about 0.5 percent by weight or more, about 1.0 percent by weight or more, or about 1.5 percent by weight or more, but will typically make up about 10 percent or less, or about 7.5 percent or less, or about 5 percent or less (e.g., from about 0.5 to about 5 percent by weight) of the total weight of the composition.

Sweeteners

In order to improve the sensory properties of the composition according to the disclosure, one or more sweeteners may be added. The sweeteners can be any sweetener or combination of sweeteners, in natural or artificial form, or as a combination of natural and artificial sweeteners. Examples of natural sweeteners include fructose, sucrose, glucose, maltose, isomaltulose, mannose, galactose, lactose, stevia, honey, and the like. Examples of artificial sweeteners include sucralose, maltodextrin, saccharin, aspartame, acesulfame K, neotame and the like. In some embodiments, the sweetener comprises one or more sugar alcohols. Sugar alcohols are polyols derived from monosaccharides or disaccharides that have a partially or fully hydrogenated form. Sugar alcohols have, for example, about 4 to about 20 carbon atoms and include erythritol, arabitol, ribitol, isomalt, maltitol, dulcitol, iditol, mannitol, xylitol, lactitol, sorbitol, and combinations thereof (e.g., hydrogenated starch hydrolysates).

When present, a sweetener or combination of sweeteners may make up from about 0.1 to about 20 percent or more by weight of the of the composition, for example, from about 0.1 to about 1%, from about 1 to about 5%, from about 5 to about 10%, or from about 10 to about 20% by weight, based on the total weight of the composition.

Buffering Agents

In certain embodiments, the composition of the present disclosure can comprise pH adjusters or buffering agents. Examples of pH adjusters and buffering agents that can be used include, but are not limited to, metal hydroxides (e.g., alkali metal hydroxides such as sodium hydroxide and potassium hydroxide), and other alkali metal buffers such as metal carbonates (e.g., potassium carbonate or sodium carbonate), or metal bicarbonates such as sodium bicarbonate, and the like. Where present, the buffering agent is typically present in an amount less than about 5 percent based on the weight of the composition, for example, from about 0.5% to about 5%, such as, e.g., from about 0.75% to about 4%, from about 0.75% to about 3%, or from about 1% to about 2% by weight, based on the total weight of the composition. Non-limiting examples of suitable buffers include alkali metals acetates, glycinates, phosphates, glycerophosphates, citrates, carbonates, hydrogen carbonates, borates, or mixtures thereof.

Colorants

A colorant may be employed in amounts sufficient to provide the desired physical attributes to the composition according to the present disclosure. Examples of colorants include various dyes and pigments, such as caramel coloring and titanium dioxide. The amount of colorant utilized in the composition can vary, but when present is typically up to about 3 weight percent, such as from about 0.1%, about 0.5%, or about 1%, to about 3% by weight, based on the total weight of the composition.

Oral Care Ingredients

Oral care ingredients provide the ability to inhibit tooth decay or loss, inhibit gum disease, relieve mouth pain, whiten teeth, or otherwise inhibit tooth staining, elicit salivary stimulation, inhibit breath malodor, freshen breath, or the like. For example, effective amounts of ingredients such as thyme oil, eucalyptus oil and zinc (e.g., such as the ingredients of formulations commercially available as ZYTEX® from Discus Dental) can be incorporated into the composition as disclosed herein. Other examples of ingredients that can be incorporated in desired effective amounts within the present composition can include those that are incorporated within the types of oral care compositions set forth in Takahashi et al., Oral Microbiology and Immunology, 19(1), 61-64 (2004); U.S. Pat. No. 6,083,527 to Thistle; and US Pat. Appl. Pub. Nos. 2006/0210488 to Jakubowski and 2006/02228308 to Cummins et al. Other exemplary ingredients include those contained in formulations marketed as MALTISORB® by Roquette and DENTIZYME® by NatraRx. When present, a representative amount of oral care additive is at least about 1 percent, often at least about 3 percent, and frequently at least about 5 percent of the total weight of the composition. The amount of oral care additive will not typically exceed about 30 percent, often will not exceed about 25 percent, and frequently will not exceed about 20 percent, of the total weight of the composition.

Humectants

In certain embodiments, one or more humectants may be employed in the composition of the present disclosure. Examples of humectants include, but are not limited to, glycerin, propylene glycol, and the like. Where included, the humectant is typically provided in an amount sufficient to provide desired moisture attributes to the composition. Further, in some instances, the humectant may impart desirable flow characteristics to the composition for depositing in a mold. When present, a humectant will typically make up about 5% or less of the weight of the composition (e.g., from about 0.5 to about 5% by weight). When present, a representative amount of humectant is about 0.1% to about 1% by weight, or about 1% to about 5% by weight, based on the total weight of the composition.

Tobacco Material

In some embodiments, the composition of the present disclosure may include a tobacco material. The tobacco material can vary in species, type, and form. Generally, the tobacco material is obtained from for a harvested plant of the *Nicotiana* species. Example *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia*, and *N. spegazzinii*. Various representative other types of plants from the *Nicotiana* species are set forth in Goodspeed, The Genus *Nicotiana*, (Chonica Botanica) (1954); U.S. Pat. No. 4,660,577 to Sensabaugh, Jr. et al.; U.S. Pat. No. 5,387,416 to White et al., U.S. Pat. No. 7,025,066 to Lawson et al.; U.S. Pat. No. 7,798,153 to Lawrence, Jr. and U.S. Pat. No. 8,186,360 to Marshall et al.; each of which is incorporated herein by reference. Descriptions of various types of tobaccos, growing practices and harvesting practices are set forth in Tobacco Production, Chemistry and Technology, Davis et al. (Eds.) (1999), which is incorporated herein by reference.

*Nicotiana* species from which suitable tobacco materials can be obtained can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO2008/103935 to Nielsen et al. See, also, the types of tobaccos that are set forth in U.S. Pat. No. 4,660,577 to Sensabaugh, Jr. et al.; U.S. Pat. No. 5,387,416 to White et al.; and U.S. Pat. No. 6,730,832 to Dominguez et al., each of which is incorporated herein by reference.

The *Nicotiana* species can, in some embodiments, be selected for the content of various compounds that are present therein. For example, plants can be selected on the basis that those plants produce relatively high quantities of one or more of the compounds desired to be isolated therefrom. In certain embodiments, plants of the *Nicotiana* species (e.g., *Galpao commun* tobacco) are specifically grown for their abundance of leaf surface compounds. Tobacco plants can be grown in greenhouses, growth chambers, or outdoors in fields, or grown hydroponically.

Various parts or portions of the plant of the *Nicotiana* species can be included within a composition as disclosed herein. For example, virtually all of the plant (e.g., the whole plant) can be harvested, and employed as such. Alternatively, various parts or pieces of the plant can be harvested or separated for further use after harvest. For example, the flower, leaves, stem, stalk, roots, seeds, and various combinations thereof, can be isolated for further use or treatment. In some embodiments, the tobacco material comprises tobacco leaf (lamina). The composition as disclosed herein can include processed tobacco parts or pieces, cured and aged tobacco in essentially natural lamina and/or stem form, a tobacco extract, extracted tobacco pulp (e.g., using water as a solvent), or a mixture of the foregoing (e.g., a mixture that combines extracted tobacco pulp with granulated cured and aged natural tobacco lamina).

In certain embodiments, the tobacco material comprises solid tobacco material selected from the group consisting of lamina and stems. The tobacco that is used for the mixture most preferably includes tobacco lamina, or a tobacco lamina and stem mixture (of which at least a portion is smoke-treated). Portions of the tobaccos within the mixture may have processed forms, such as processed tobacco stems (e.g., cut-rolled stems, cut-rolled-expanded stems or cut-puffed stems), or volume expanded tobacco (e.g., puffed tobacco, such as dry ice expanded tobacco (DIET)). See, for example, the tobacco expansion processes set forth in U.S. Pat. No. 4,340,073 to de la Burde et al.; U.S. Pat. No. 5,259,403 to Guy et al.; and U.S. Pat. No. 5,908,032 to Poindexter, et al.; and U.S. Pat. No. 7,556,047 to Poindexter, et al., all of which are incorporated by reference. In addition, the composition optionally may incorporate tobacco that has been fermented. See, also, the types of tobacco processing techniques set forth in PCT Application Publication No. WO2005/063060 to Atchley et al., which is incorporated herein by reference.

Where used within a composition as disclosed herein, the tobacco material is typically used in a form that can be described as particulate (i.e., shredded, ground, granulated, or powder form). The tobacco plant or portion thereof can be separated into individual parts or pieces (e.g., the leaves can be removed from the stems, and/or the stems and leaves can be removed from the stalk). The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders).

The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces may be ground or milled when the moisture content thereof is less than about 15 weight percent or less than about 5 weight percent. The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent. Most preferably, the tobacco material is employed in the form of parts or pieces that have an average particle size between 1.4 millimeters and 250 microns. In some instances, the tobacco particles may be sized to pass through a screen mesh to obtain the particle size range required. If desired, air classification equipment may be used to ensure that small sized tobacco particles of the desired sizes, or range of sizes, may be collected. If desired, differently sized pieces of granulated tobacco may be mixed together.

For the preparation of oral products, it is typical for a harvested plant of the *Nicotiana* species to be subjected to a curing process. The tobacco materials incorporated within the composition for inclusion within products as disclosed herein are those that have been appropriately cured and/or aged. Descriptions of various types of curing processes for various types of tobaccos are set forth in *Tobacco Production, Chemistry and Technology*, Davis et al. (Eds.) (1999). Examples of techniques and conditions for curing flue-cured tobacco are set forth in Nestor et al., *Beitrage Tabakforsch. Int.*, 20, 467-475 (2003) and U.S. Pat. No. 6,895,974 to Peele, which are incorporated herein by reference. Representative techniques and conditions for air curing tobacco are set forth in U.S. Pat. No. 7,650,892 to Groves et al.; Roton et al., *Beitrage Tabakforsch. Int.*, 21, 305-320 (2005) and Staaf et al., *Beitrage Tabakforsch. Int.*, 21, 321-330 (2005), which are incorporated herein by reference. Certain types of tobaccos can be subjected to alternative types of curing processes, such as fire curing or sun curing.

In certain embodiments, tobacco materials that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Madole, Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos and various blends of any of the foregoing tobaccos.

The tobacco material may also have a so-called "blended" form. For example, the tobacco material may include a mixture of parts or pieces of flue-cured, burley (e.g., Malawi burley tobacco) and Oriental tobaccos (e.g., as tobacco composed of, or derived from, tobacco lamina, or a mixture of tobacco lamina and tobacco stem). For example, a representative blend may incorporate about 30 to about 70 parts burley tobacco (e.g., lamina, or lamina and stem), and about 30 to about 70 parts flue cured tobacco (e.g., stem, lamina, or lamina and stem) on a dry weight basis. Other example tobacco blends incorporate about 75 parts flue-cured tobacco, about 15 parts burley tobacco, and about 10 parts Oriental tobacco; or about 65 parts flue-cured tobacco, about 25 parts burley tobacco, and about 10 parts Oriental tobacco; or about 65 parts flue-cured tobacco, about 10 parts burley tobacco, and about 25 parts Oriental tobacco; on a dry weight basis. Other example tobacco blends incorporate about 20 to about 30 parts Oriental tobacco and about 70 to about 80 parts flue-cured tobacco on a dry weight basis.

Tobacco materials used in the present disclosure can be subjected to, for example, fermentation, bleaching, and the like. If desired, the tobacco materials can be, for example, irradiated, pasteurized, or otherwise subjected to controlled heat treatment. Such treatment processes are detailed, for example, in U.S. Pat. No. 8,061,362 to Mua et al., which is incorporated herein by reference. In certain embodiments, tobacco materials can be treated with water and an additive capable of inhibiting reaction of asparagine to form acrylamide upon heating of the tobacco material (e.g., an additive selected from the group consisting of lysine, glycine, histidine, alanine, methionine, cysteine, glutamic acid, aspartic acid, proline, phenylalanine, valine, arginine, compositions incorporating di- and trivalent cations, asparaginase, certain non-reducing saccharides, certain reducing agents, phenolic compounds, certain compounds having at least one free thiol group or functionality, oxidizing agents, oxidation catalysts, natural plant extracts (e.g., rosemary extract), and combinations thereof). See, for example, the types of treatment processes described in U.S. Pat. Nos. 8,434,496, 8,944,072, and 8,991,403 to Chen et al., which are all incorporated herein by reference. In certain embodiments, this type of treatment is useful where the original tobacco material is subjected to heat in the processes previously described.

In various embodiments, the tobacco material can be treated to extract a soluble component of the tobacco material therefrom. "Tobacco extract" as used herein refers to the isolated components of a tobacco material that are extracted from solid tobacco pulp by a solvent that is brought into contact with the tobacco material in an extraction process. Various extraction techniques of tobacco materials can be used to provide a tobacco extract and tobacco solid material. See, for example, the extraction processes described in US Pat. Appl. Pub. No. 2011/0247640 to Beeson et al., which is incorporated herein by reference. Other example techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated by reference herein.

In some embodiments, the type of tobacco material is selected such that it is initially visually lighter in color than other tobacco materials to some degree (e.g., whitened or bleached). Tobacco pulp can be whitened in certain embodiments according to any means known in the art.

Typical inclusion ranges for tobacco materials can vary depending on the nature and type of the tobacco material, and the intended effect on the composition, with an example range of up to about 30% by weight (or up to about 20% by weight or up to about 10% by weight or up to about 5% by weight), based on total weight of the composition (e.g., about 0.1 to about 15% by weight). In some embodiments, the products of the disclosure can be characterized as completely free or substantially free of tobacco material (other than purified nicotine as a possible active ingredient). In some embodiments, such products are described as having no tobacco material (other than purified nicotine as a possible active ingredient) intentionally added thereto. For example, certain embodiments can be characterized as having less than 1% by weight, or less than 0.5% by weight, or less than 0.1% by weight of tobacco material, or 0% by weight of tobacco material.

Other Additives

Other additives can be included in the composition as disclosed. For example, the composition can be processed, blended, formulated, combined, and/or mixed with other materials or ingredients. The additives can be artificial, or can be obtained or derived from herbal or biological sources. Examples of further types of additives include thickening or gelling agents (e.g., fish gelatin), preservatives (e.g., potassium sorbate and the like), disintegration aids, zinc or magnesium salts selected to be relatively water soluble for compositions with greater water solubility (e.g., magnesium or zinc gluconate) or selected to be relatively water insoluble for compositions with reduced water solubility (e.g., magnesium or zinc oxide), or combinations thereof. See, for example, those representative components, combination of components, relative amounts of those components, and manners and methods for employing those components, set forth in U.S. Pat. No. 9,237,769 to Mua et al., U.S. Pat. No. 7,861,728 to Holton, Jr. et al., US Pat. App. Pub. No. 2010/0291245 to Gao et al., and US Pat. App. Pub. No. 2007/0062549 to Holton, Jr. et al., each of which is incorporated herein by reference. Typical inclusion ranges for such additional additives can vary depending on the nature and function of the additive and the intended effect on the final composition, with an example range of up to about 10% by weight, (e.g., about 0.1 to about 5% by weight) based on total weight of the composition.

The aforementioned additives can be employed together (e.g., as additive formulations) or separately (e.g., individual additive components can be added at different stages involved in the preparation of the final product). Furthermore, the aforementioned types of additives may be encapsulated as provided in the final product or composition. Exemplary encapsulated additives are described, for example, in WO2010/132444 to Atchley, which is incorporated by reference herein. In some embodiments, the composition comprises a chromogenic material as described herein. In some embodiments, the chromogenic material is encapsulated.

Configured for Oral Use

The products as described herein are, in some embodiments, configured for oral use. The term "configured for oral use" as used herein means that the product is provided in a form such that during use, saliva in the mouth of the user causes one or more of the components of the composition (e.g., flavoring agents and/or active ingredients) to pass into the mouth of the user. In certain embodiments, the composition is adapted to deliver components to a user through mucous membranes in the user's mouth, the user's digestive system, or both, and, in some instances, said component is an active ingredient that can be absorbed through the mucous membranes in the mouth or absorbed through the digestive tract when the product is used.

The products comprising the compositions of the present disclosure may be dissolvable. As used herein, the terms "dissolve," "dissolving," and "dissolvable" refer to compositions having aqueous-soluble components that interact with moisture in the oral cavity and enter into solution, thereby causing gradual consumption of the product. According to one aspect, the dissolvable product is capable of lasting in the user's mouth for a given period of time until it completely dissolves. Dissolution rates can vary over a wide range, from about 1 minute or less to about 60 minutes. For example, fast release compositions typically dissolve and/or release the active substance in about 2 minutes or less, often about 1 minute or less (e.g., about 50 seconds or less, about 40 seconds or less, about 30 seconds or less, or about 20 seconds or less). Dissolution can occur by any means, such as melting, mechanical disruption (e.g., chewing), enzymatic or other chemical degradation, or by disruption of the interaction between the components of the composition. In some embodiments, the product can be meltable as discussed, for example, in US Patent App. Pub. No. 2012/0037175 to Cantrell et al. In other embodiments, the products do not dissolve during the product's residence in the user's mouth.

In one embodiment, the product of the present disclosure is in the form of a composition as described herein, disposed within a moisture-permeable container (e.g., a water-permeable pouch). Such compositions in the water-permeable pouch format are typically used by placing one pouch containing the composition in the mouth of a human subject/user. Generally, the pouch is placed somewhere in the oral cavity of the user, for example under the lips, in the same way as moist snuff products are generally used. The pouch preferably is not chewed or swallowed. Exposure to saliva then causes some of the components of the composition therein (e.g., flavoring agents and/or active ingredients) to pass through e.g., the water-permeable pouch and provide the user with flavor and satisfaction, and the user is not required to spit out any portion of the composition. After about 10 minutes to about 60 minutes, typically about 15 minutes to about 45 minutes, of use/enjoyment, substantial amounts of the composition have been absorbed through oral mucosa of the human subject, and the pouch may be removed from the mouth of the human subject for disposal.

Figure 1:
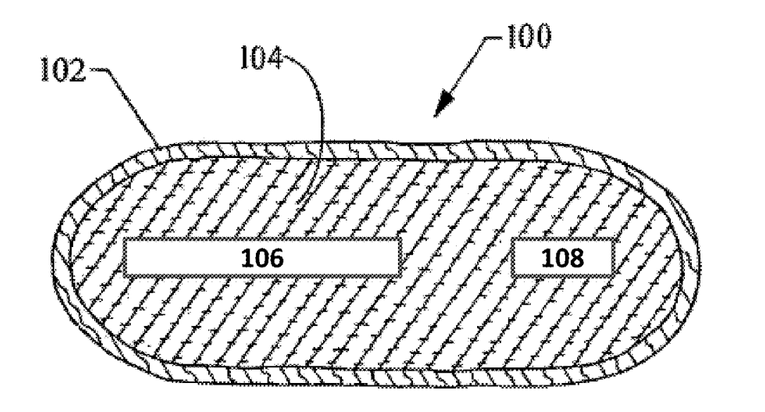
FIG. 1 is a perspective view of a pouched product embodiment, taken across the width of the product, showing an outer pouch filled with a composition for oral use.

Accordingly, in certain embodiments, the composition as disclosed herein and any other components noted above are combined within a moisture-permeable packet or pouch that acts as a container for use of the composition to provide a pouched product configured for oral use. Certain embodiments of the disclosure will be described with reference to FIG. 1 of the accompanying drawing, and these described embodiments involve snus-type products having an outer pouch and containing a composition as described herein. As explained in greater detail below, such embodiments are provided by way of example only, and the pouched products of the present disclosure can include the composition in other forms. The composition/construction of such packets or pouches, such as the container pouch 102 in the embodiment illustrated in FIG. 1, may be varied. Referring to FIG. 1, there is shown a first embodiment of a pouched product 100. The pouched product 100 includes a moisture-permeable container in the form of a porous pouch 102, which contains a material 104 comprising a composition as described herein. In some embodiments, the pouched product 100 comprises an electronic component 106 responsive to a stimulus, the electronic component disposed 106 on a portion of the porous pouch 102. In some embodiments, the pouched product 100 further comprises one or more electronic components 108 configured to relay information to a portable electronic device.

Suitable packets, pouches or containers of the type used for the manufacture of smokeless tobacco products are available under the tradenames CatchDry, Ettan, General, Granit, Goteborgs Rape, Grovsnus White, Metropol Kaktus, Mocca Anis, Mocca Mint, Mocca Wintergreen, Kicks, Probe, Prince, Skruf and TreAnkrare. The composition may be contained in pouches and packaged, in a manner and using the types of components used for the manufacture of conventional snus types of products. The pouch provides a liquid-permeable container of a type that may be considered to be similar in character to the mesh-like type of material that is used for the construction of a tea bag. Components of the composition readily diffuse through the pouch and into the mouth of the user.

Non-limiting examples of suitable types of pouches are set forth in, for example, U.S. Pat. No. 5,167,244 to Kjerstad and U.S. Pat. No. 8,931,493 to Sebastian et al.; as well as US Patent App. Pub. Nos. 2016/0000140 to Sebastian et al.; 2016/0073689 to Sebastian et al.; 2016/0157515 to Chapman et al.; and 2016/0192703 to Sebastian et al., each of which is incorporated herein by reference. Pouches can be provided as individual pouches, or a plurality of pouches (e.g., 2, 4, 5, 10, 12, 15, 20, 25 or 30 pouches) can be connected or linked together (e.g., in an end-to-end manner) such that a single pouch or individual portion can be readily removed for use from a one-piece strand or matrix of pouches.

An example pouch may be manufactured from materials, and in such a manner, such that during use by the user, the pouch undergoes a controlled dispersion or dissolution. Such pouch materials may have the form of a mesh, screen, perforated paper, permeable fabric, or the like. For example, pouch material manufactured from a mesh-like form of rice paper, or perforated rice paper, may dissolve in the mouth of the user. As a result, the pouch and composition each may undergo complete dispersion within the mouth of the user during normal conditions of use, and hence the pouch and composition both may be ingested by the user. Other examples of pouch materials may be manufactured using water dispersible film forming materials (e.g., binding agents such as alginates, carboxymethylcellulose, xanthan gum, pullulan, and the like), as well as those materials in combination with materials such as ground cellulosics (e.g., fine particle size wood pulp). Preferred pouch materials, though water dispersible or dissolvable, may be designed and manufactured such that under conditions of normal use, a significant amount of the composition contents permeate through the pouch material prior to the time that the pouch undergoes loss of its physical integrity. If desired, flavoring ingredients, disintegration aids, and other desired components, may be incorporated within, or applied to, the pouch material.

The amount of composition contained within each product unit, for example, a pouch, may vary. In some embodiments, the weight of the composition within each pouch is at least about 50 mg, for example, from about 50 mg to about 2 grams, from about 100 mg to about 1.5 grams, or from about 200 to about 700 mg. In some smaller embodiments, the weight of the composition within each pouch may be from about 100 to about 300 mg. For a larger embodiment, the weight of the material within each pouch may be from about 300 mg to about 700 mg. If desired, other components can be contained within each pouch. For example, at least one flavored strip, piece or sheet of flavored water dispersible or water soluble material (e.g., a breath-freshening edible film type of material) may be disposed within each pouch along with or without at least one capsule. Such strips or sheets may be folded or crumpled in order to be readily incorporated within the pouch. See, for example, the types of materials and technologies set forth in U.S. Pat. No. 6,887,307 to Scott et al. and U.S. Pat. No. 6,923,981 to Leung et al.; and The EFSA Journal (2004) 85, 1-32; which are incorporated herein by reference.

In certain embodiments, one or more active ingredients or flavorants or both, as described herein, are included in the composition within the pouched product, and one or more further active ingredients or flavorants, or both, are disposed in or on the external surface of the product (e.g., on or in the pouch material as disclosed herein). In some embodiments, separate location of the active ingredients may allow differential release profiles (e.g., one active ingredient may be rapidly available to the mouth and/or digestive system, and the other active ingredient may be released more gradually with product use). In certain embodiments, the composition comprises a chromogenic material configured to provide a color change upon dissolution in saliva in the mouth of the user.

A pouched product as described herein can be packaged within any suitable inner packaging material and/or outer container. See also, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; U.S. Pat. No. 8,397,945 to Gelardi et al., D592,956 to Thiellier; D594,154 to Patel et al.; and D625,178 to Bailey et al.; US Pat. Pub. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; and 2010/0133140 to Bailey et al; 2010/0264157 to Bailey et al.; and 2011/0168712 to Bailey et al. which are incorporated herein by reference.

Electronic Tobacco Heating Products

In some embodiments, the pouched product as disclosed herein is adapted for use in other types of products (i.e., for use other than directly within the oral cavity as a pouched product). For example, the pouched product may be utilized to generate an aerosol in an electronic tobacco heating product (ETHP). By "electronic tobacco heating product" is meant a device which utilizes electrically generated heat to heat tobacco or a tobacco-derived material, preferably without significant combustion, in order to provide an inhalable substance in the form of an aerosol for human consumption. Accordingly, in some embodiments, the pouched product as disclosed herein further comprises an electronic tobacco heating product. Suitable ETHP devices for use with the present pouched products are known in the art.

See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference in its entirety. Other representative cigarettes or smoking articles that have been described and, in some instances, been made commercially available include those described in U.S. Pat. No. 4,735,217 to Gerth et al.; U.S. Pat. Nos. 4,922,901, 4,947,874, and 4,947,875 to Brooks et al.; U.S. Pat. No. 5,060,671 to Counts et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano; U.S. Pat. No. 6,772,756 to Shayan; U.S. Pat. App. Pub. No. 2009/0095311 to Hon; U.S. Pat. App. Pub. Nos. 2006/0196518, 2009/0126745, and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; and PCT Pat. App. Pub. No. WO 2010/091593 to Hon, which are incorporated herein by reference.

Representative products that resemble many of the attributes of traditional types of cigarettes, cigars or pipes have been marketed as ACCORD® by Philip Morris Incorporated; ALPHA™, JOVE 510™ and M4™ by InnoVapor LLC; CIRRUS™ and FLING™ by White Cloud Cigarettes; BLU™ by Fontem Ventures B.V.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™ HENDU™ JET™, MAXXQ™ PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; SOUTH BEACH SMOKE™; IQOS™ by Philip Morris International; and GLO™ by British American Tobacco."

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A pouched product configured for oral use, comprising a porous pouch material which is a nonwoven fleece material comprising a chromogenic material which is a moisture-sensitive indicator, and further comprising a composition enclosed within the porous pouch material, the composition comprising:
   a particulate cellulose-based filler in an amount of at least 30% by weight, based on the total weight of the composition; and
   one or more flavorants, active ingredients, or both.

2. The pouched product of claim 1, wherein the chromogenic material is adsorbed in the porous pouch material.

3. The pouched product of claim 1, wherein the chromogenic material is embedded in the porous pouch material.

4. The pouched product of claim 1, wherein the chromogenic material is printed on the porous pouch material.

5. The pouched product of claim 1, wherein the chromogenic material is covalently bound to the porous pouch material.

6. A pouched product configured for oral use, comprising a porous pouch material which is a nonwoven fleece material comprising a thermochromic material, and further comprising a composition enclosed within the porous pouch material, the composition comprising:
   a particulate cellulose-based filler in an amount of at least 30% by weight, based on the total weight of the composition; and one or more flavorants, active ingredients, or both.

7. The pouched product of claim 6, wherein the thermochromic material is a liquid crystal.

8. The pouched product of claim 6, wherein the thermochromic material is a leuco dye.

9. The pouched product of claim 6, wherein the thermochromic material is adsorbed in the porous pouch material.

10. The pouched product of claim 6, wherein the thermochromic material is embedded in the porous pouch material.

11. The pouched product of claim 6, wherein the thermochromic material is printed on the porous pouch material.

12. The pouched product of claim 6, wherein the thermochromic material is covalently bound to the porous pouch material.

* * * * *